(12) United States Patent
Gaynor et al.

(10) Patent No.: US 6,382,122 B1
(45) Date of Patent: May 7, 2002

(54) METHOD FOR INITIALIZING A MARINE VESSEL CONTROL SYSTEM

(75) Inventors: Phillip K. Gaynor, Fon du Lac; Kurt D. Willows, West Bend; John W. Wyant, Fond du Lac, all of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/888,156

(22) Filed: Jun. 22, 2001

(51) Int. Cl.⁷ .............................................. B63H 25/00
(52) U.S. Cl. ................... 114/144 RE; 440/84
(58) Field of Search ...................... 114/144 RE, 114 E; 701/206, 213; 440/84, 1, 2, 3

(56) References Cited

U.S. PATENT DOCUMENTS

| | | | |
|---|---|---|---|
| 4,739,236 A | * 4/1988 | Burkenpas | 440/87 |
| 5,444,626 A | 8/1995 | Schenk | |
| 5,469,150 A | 11/1995 | Sitte | |
| 5,860,020 A | 1/1999 | Van Venrooy et al. | |
| 5,903,565 A | 5/1999 | Meuhaus et al. | |
| 6,038,500 A | 3/2000 | Weiss | |
| 6,109,986 A | 8/2000 | Gaynor et al. | |
| 6,273,771 B1 | * 8/2001 | Buckley et al. | 440/84 |
| 6,299,493 B1 | * 10/2001 | Griffith, Sr. et al. | 440/6 |

FOREIGN PATENT DOCUMENTS

FR    2666922 A  *  3/1992  ............. 114/144 E

* cited by examiner

Primary Examiner—S. Joseph Morano
Assistant Examiner—Ajay Vasudeva
(74) Attorney, Agent, or Firm—William D. Lanyi (57) ABSTRACT

An auto detect system is provided for a marine vessel in which the various associations and relationships between marine propulsion devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with reference to their location on the marine vessel and to identify certain other components, such as gauges, with reference to both their location at a particular helm station and their association with a particular marine propulsion device.

20 Claims, 4 Drawing Sheets

METHOD FOR INITIALIZING A MARINE VESSEL CONTROL SYSTEM

BACKGROUND OF THE INVENTION

1. Field of the Invention

The present invention is generally related to a control system for a marine vessel and, more particularly, to a method or system by which the control system can easily and quickly be initialized during the construction and assembly of the marine vessel or, alternatively, during a retrofit or recalibration procedure involving the marine vessel.

2. Description of the Prior Art

Marine vessels, particularly those with helms or control stations located away from the marine propulsion devices, require some way to allow the marine vessel operator to be located at a helm or control station and be able to control the operation of the marine vessel. This control includes the throttle control, steering control, and the monitoring of various operating parameters relating to the vessel. Some marine vessels provide mechanical steering and throttle controls which use cables connected between the marine propulsion system and the control station or helm. Other marine vessel control systems can utilize "drive-by-wire" systems in which electronic signals are transmitted between the control station and the marine propulsion system to affect steering and/or engine speed control. Various types of control systems have been developed to allow an operator to control a land vehicle or marine vessel. Some control systems incorporate numerous components that are connected by individual conductive wires to a central control station. Similarly, gauges are individually connected by conductive wire to various sensors in a typical application. Alternatively, other systems use a common communication bus to which all devices in the system are connected. One type of communication bus is known as the controller area network (CAN) bus.

U.S. Pat. No. 6,038,500, which issued to Weiss on Mar. 14, 2000, describes a computer/bus message system for vehicle drive control systems. A drive system for utility vehicles, in particular for agricultural or industrial tractors, includes a generator driven by an internal combustion engine, a drive axle with wheels driven by associated electric motors which are powered by the generator, a steerable axle with wheels which are steerable together or individually by steering actuators, and manual operating control devices for vehicle operating functions such as steering. The drive system includes a process computer which includes parallel and independently operating function modules for controlling high priority vehicle functions, such as steering, as well as function modules for low priority vehicle functions, such as speed input. The process computer transmits target value signals for actuators, such as electric wheel drive motors and steering actuators, in the form of a combined message communicating over a system bus. Information is exchanged between the function modules internally within the processor.

U.S. Pat. No. 5,469,150, which issued to Site on Nov. 21, 1995, describes a sensor actuator bus system. A four-wire bus is provided with a two-wire signal bus and a plurality of sensors and actuators attached to both two-wire busses. A modification is provided to the standard controller area network (CAN) protocol developed and provided by Robert Bosch GmbH, in which the standard CAN header, of a data packet is modified to incorporate a shortened device identifier priority. By shortening the identifier field of the CAN header three bits are made available for use as a short form protocol data unit which can be used to contain binary information representing both the change of status of a identified device and the current status of the device.

U.S. Pat. No. 5,903,565, which issued to Neuhaus et al on May 11, 1999, describes a serial bus system using bitwise arbitration for independently communicating with and controlling individual bus systems. A star coupler for serial bus systems operates in compliance with the carrier sense multiple access (CSMA) method. The star coupler connects a plurality of individual bus systems to corresponding T-drivers and associated logic circuits, so that arbitration is performed within the total bus system in which all individual bus systems are included. Feedback suppression is used to assure unidirectional data flow, while error detection is combined with switching logic to disable faulty individual bus systems without affecting the other connected individual bus systems.

U.S. Pat. No. 5,860,020, which issued to Van Venrooy et al on Jan. 12, 1999, describes an operating system for a real-time hybrid environment. A distributed data processing system in an surface vehicle comprises sensors, user I/O, data processing and mass storage of geographical data. By means of a restricted library of system calls or primitives that can only be processed as unitary entities after deterministic transport control while keeping the transfer stateless, the distributed real-time operating system allows coexistent running of a plurality of processes that share localized processing power and/or a device, a sensor, I/O and/or file date.

U.S. Pat. No. 5,444,626, which issued to Schenk on Aug. 22, 1995, describes a control system for calculating parameter control values in repetitive control processes. It is known for a central electronic control unit in a motor vehicle to exchange data through a serial data bus with other control units, such as those for fuel injection, ignition timing, and braking. Prior art systems transmitted these data automatically, regardless of whether all these parameters were relevant to the actual operating state of the vehicle, thereby resulting in heavy loading of the serial bus. The present invention determines which parameters are irrelevant to the current operating state and suppresses transmission, or even calculation, of these irrelevant parameters.

U.S. Pat. No. 6,109,986, which issued to Gaynor et al on Aug. 29, 2000, discloses an idle speed control system for a marine propulsion system. The idle speed control system for a marine propulsion system controls the amount of fuel injected into the combustion chamber of an engine cylinder as a function of the error between a selected target speed and an actual speed. Speed can be engine speed measured in revolutions per minute or, alternatively, it can be a boat speed measured in nautical miles per hour or kilometers per hour. By comparing target speed to actual speed, the control system selects an appropriate pulse width length for the injection of fuel into the combustion chamber and regulates the speed by increasing or decreasing the pulse width.

U.S. Pat. No. 6,273,771, which issued to Buckley et al on Aug. 14, 2001, discloses a control system for a marine vessel which incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

In a marine vessel control system, such as that described in U.S. Pat. No. 6,273,771, many configurations of marine propulsion systems can be provided. The marine vessel builder or outfitter has a wide choice of marine propulsion devices, helm control systems, and peripheral devices from which to choose in constructing the control and propulsion system for the marine vessel. When all of the devices on a marine vessel are connected to a serial communication bus, it is necessary for the outfitter or boat builder to make sure that all of the devices on the marine vessel are compatible with each other and, furthermore, that the various devices are completely aware of their particular function on the marine vessel and the function of other components with which they must operate.

The patents described above are hereby explicitly incorporated by reference in the description of the present invention.

It would therefore be significantly beneficial if an automatic or partially automatic procedure could be developed in which a boat builder or marine vessel outfitter could easily cause all of the components connected to a serial is communication bus of a marine vessel to be properly identified to all of the other components and devices with which it must operate cooperatively.

SUMMARY OF THE INVENTION

A method for initializing a marine vessel control system, in accordance with the preferred embodiment of the present invention, comprises the steps of determining the number of individual marine propulsion devices (e.g. outboard motors, stem drive devices, inboard systems, jet drive systems) associated with the marine vessel and identifying each of the individual marine propulsion devices when it is determined that more than one of the individual marine propulsion devices are associated with the marine vessel. The method of the present invention, in a preferred embodiment, further comprises the steps of determining the number of control stations, or helms, associated with the marine vessel and identifying each of the control stations when it is determined that more than one of the control stations are associated with the marine vessel. The determining step relating to the number of individual marine propulsion devices, in a particularly preferred embodiment, comprises the step of interrogating a signal on a communication bus to determine if more than one of the individual marine propulsion devices is transmitting a signal on the communication bus. This step is performed by a microprocessor, connected in signal communication with the communication bus, which knows the expected timing intervals during which each individual marine propulsion device provides a signal on the communication bus. If the signal frequency for data packets on the communication bus exceeds an expected magnitude, this is indicative that more than one marine propulsion device is connected to the system.

The method of the present invention further comprises the step of prompting a human being to identify the physical location of each of the individual marine propulsion devices on the marine vessel when it is determined that more than one individual marine propulsion device is associated with the marine vessel.

A preferred embodiment of the present invention further comprises the step of determining the number of individual gauges associated with the marine vessel and identifying each of the individual gauges in terms of its relationship with an associated one of the individual marine propulsion devices on the marine vessel when more than one of the individual gauges is associated with a marine vessel. The method of the present invention can further comprise the step of prompting an operator to identify each of the individual gauges in terms of its association with an associated one of the individual marine propulsion devices on the marine vessel and, in addition, in terms of its association with one of the control stations or helms.

In a particularly preferred embodiment of the present invention, the marine vessel control system comprises a controller area network (CAN) system. The method of the present invention can further comprise the step of determining the operational type of each of the individual marine propulsion devices associated with the marine vessel, wherein the operational type of each of the individual marine propulsion devices associated with the marine vessel is obtained from a data packet comprising of a plurality of bytes, or pages, of information. The data packet is transmitted on a controller area network communication bus by each of the individual marine propulsion devices associated with the marine vessel.

The present invention further comprises the step of selecting a default screen display for each of the control stations of the marine vessel as a function of the operational type of each of the individual marine propulsion devices.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

In order to fully understand and appreciate the concept of the present invention, it is necessary to understand how a marine vessel would typically be configured and assembled, or outfitted, without the use of the present invention. Certain marine vessels, particularly larger pleasure boats, are provided with several marine propulsion devices, such as outboard motors, stem drive systems, or inboard propulsion systems. In addition, marine vessels are often provided with two or more helm stations, or control stations, where a marine vessel operator can be located for the purpose of controlling the operation of the marine vessel. Each helm, or control station, is provided with the necessary devices to allow the marine vessel operator to control the speed of the boat, to steer the boat, and to monitor a plurality of gauges, which are associated with particular sensors, so that the operator of the marine vessel can be aware of the status of several monitored parameters, such as oil pressure, water temperature, and engine speed. If each marine propulsion device is individually wired to each helm or control station and each sensor associated with the marine propulsion devices is individually wired to the gauges at both helms, it is a relatively simple task for the marine vessel operator to connect all of the gauges and sensors to their appropriate associated devices. This direct hard wired connection defines the relationships between components, helms, and propulsion devices. However, if all of the marine propulsion devices and associated sensors and gauges are connected in signal communication with a common serial communication bus, identifying each of the components is not always an easy task. The gauges at each helm must know the proper marine propulsion device with which they are associated. Each gauge must also know at which helm station they are located. Furthermore, the main controller, or microprocessor must also know the number of marine propulsion devices associated with the marine vessel and, more importantly, must be able to discern the source of sensor information transmitted by the marine propulsion devices. When all of the marine propulsion devices, all of the associated gauges of the marine vessel, and all of the helm stations of the marine vessel are all connected directly to a single serial communication bus, such as a controller area network (CAN), it is easy to appreciate how difficult the task can be for a boat builder or a person configuring a marine vessel to make sure that each component on the marine vessel is appropriately assigned to its associated marine propulsion device, gauge, sensor, or helm station. The present invention provides a method which significantly simplifies this process for the party configuring a marine vessel.

Figure 1:
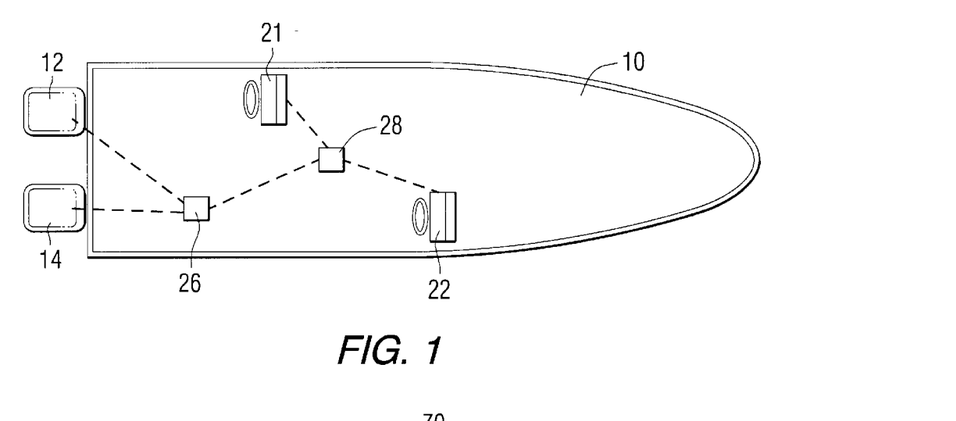
FIG. 1 is simplified representation of a marine vessel with two marine propulsion devices and two helm stations.

To more clearly understand the problem to which the present invention is addressed, FIG. 1 shows an exemplary marine vessel 10 with two marine propulsion devices, 12 and 14, attached to the marine vessel 10. Two helm stations, 21 and 22, are provided on the marine vessel 10 to allow the operator of the marine vessel to direct the operation of the boat from either of the two helm stations. The dashed lines in FIG. 1 represent the connection between components provided by a serial communication bus. Two bus connectors, 26 and 28, are provided to allow each of the various components to be connected to the serial bus. Although not illustrated in FIG. 1, it should also be understood that each of the two helm stations, 21 and 22, are provided with a plurality of gauges or annunciators that allow the operator to monitor various parameters relating to the marine vessel 10 and its marine propulsion devices, 12 and 14. Although the illustration of FIG. 1 shows two marine propulsion devices, 12 and 14, which are illustrated to represent outboard motors attached to the transom of the marine vessel 10, it should be understood that any number and type of marine propulsion devices can be used. Although a single marine propulsion device is sometimes used on marine vessels, it should be understood that it is not uncommon for a boat to be equipped with two, three, or more outboard motors. In addition, a plurality of jet drives, inboard drives, or stern drive systems, is also common on marine vessels.

With continued reference to FIG. 1, it can be appreciated that each of the components attached to the controller area network (CAN) serial bus transmits or receives data from the bus. Since there is no direct hard wired connection between the various components with specific other components, some way must be provided to allow each of the devices of the marine propulsion system to ascertain the number of other devices on the system and, most importantly, be able to determine the identity of particular other components with which it is directly related. As an example, a specific gauge at helm station 21 must be able to determine at which helm station it is located and, in addition, with which specific marine propulsion device it is associated. For example, if a temperature gauge at one helm station 21 is associated with a temperature sensor of the port outboard motor 12, it receives its information relating to that temperature from the communication bus. It must be programmed in such a way that it realizes which packets of information on the communication bus are meant for display on its gauge annunciator. Similarly, all gauges at both helm stations, 21 and 22, must access the appropriate information from the communication bus related to their associated marine propulsion devices and display that information for the marine vessel operator.

While this arrangement can be fairly simple when all sensors, gauges, and marine propulsion devices are hard wired directly to their associated components, this task is much more difficult when a single serial communication bus is used. Although it is recognized that a marine vessel outfitter or boat builder can individually program each device on the marine vessel 10 to achieve this purpose, it can easily be recognized that this task can be very cumbersome and extremely difficult when large pluralities of marine propulsion devices, helm stations, and gauges are provided on the marine vessel.

Figure 2:
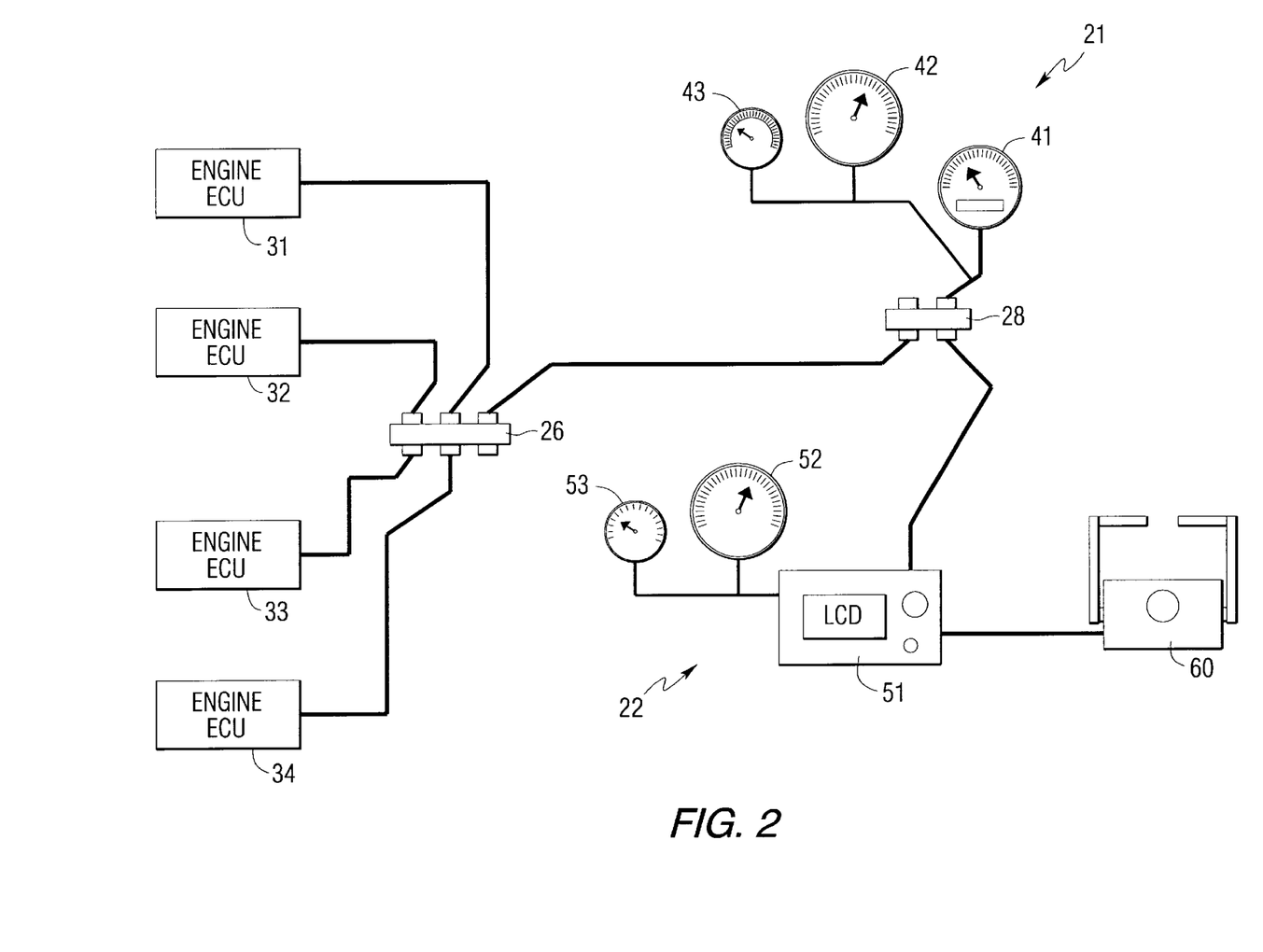
FIG. 2 shows a marine propulsion system with two helm stations and four engine control units along with several gauges.

FIG. 2 illustrates a marine vessel control system that can be used and a marine vessel 10 such as that described above in conjunction with FIG. 1. FIG. 2 does not show the actual marine propulsion devices, such as the outboard motors 12 and 14 discussed above, but shows the engine control units (ECU's) that would be associated with the four marine propulsion devices of the marine vessel 10. Each of the engine control units, 31–34, are connected in signal communication with a connector 26 which is, in turn, connected in signal communication with another connector 28. At one helm station 21, several gauges, 41–43, are illustrated. Through their connection to connector 28, the gauges at helm station 21 are connected directly to the serial communication bus. Similarly, at the other helm station 22, a liquid crystal display 51 and two exemplary gauges, 52 and 53, are illustrated. At helm station 22, a throttle control mechanism 60 is also shown connected to the liquid crystal display 51. Although not shown in FIG. 2, it should be understood that each helm station could be provided with a throttle control mechanism similar to that illustrated schematically and identified by reference numeral 60 in FIG. 2. Also, in a steer-by-wire system, steering wheels at each helm station would be also connected to the serial communication bus.

In order to illustrate a potential problem faced by marine vessel builders and outfitters, it must be realized that each helm station in FIG. 2 would actually contain one gauge representing a parameter (e.g. temperature, engine speed, oil pressure) for each of the four marine propulsion devices. In other words, four temperature gauges could be located at each helm station to show the cooling water temperature of each of the four engines. Similarly, four oil pressure gauges or four tachometers would also be located at each of the helm stations. Each of these gauges is intended to display a particular parameter associated with a particular one of the four marine propulsion devices represented by the engine control units, 31–34, in FIG. 2. Even if a combination gauge is used to display more than one monitored parameter, that combination gauge must be able to display the information relating to a particular associated engine. It is therefore necessary for the boat builder or marine outfitter be able to program each of the gauges and sensors and engines to make sure that they are providing the correct information to the correct gauge and displaying the proper information at each of the numerous gauges on the marine vessel. Since, prior to assembly on the marine vessel 10, the individual gauges and marine propulsion devices are all preprogrammed identically, it is impossible to provide this information relating to the various mutual associations of gauges, helms, sensors, and engines. This is true because it is impossible to predict how a particular marine propulsion device will be used or assembled to a marine vessel by the boat builder. As an example, if the boat builder receives a particular outboard motor from an engine manufacturer, that outboard motor might be used in a sole application on a marine vessel or, in other situations, can be one of four outboard motors on another application. For this reason, it is impossible for the manufacturer of the outboard motor to preprogram information relating to its potential future use or location. This programming and associating of the marine propulsion device with gauges and other components must be done by the boat builder or possibly, by the future owner of the marine vessel. It is therefore desirable that this process be made as easy as possible.

Figures 3, 5:
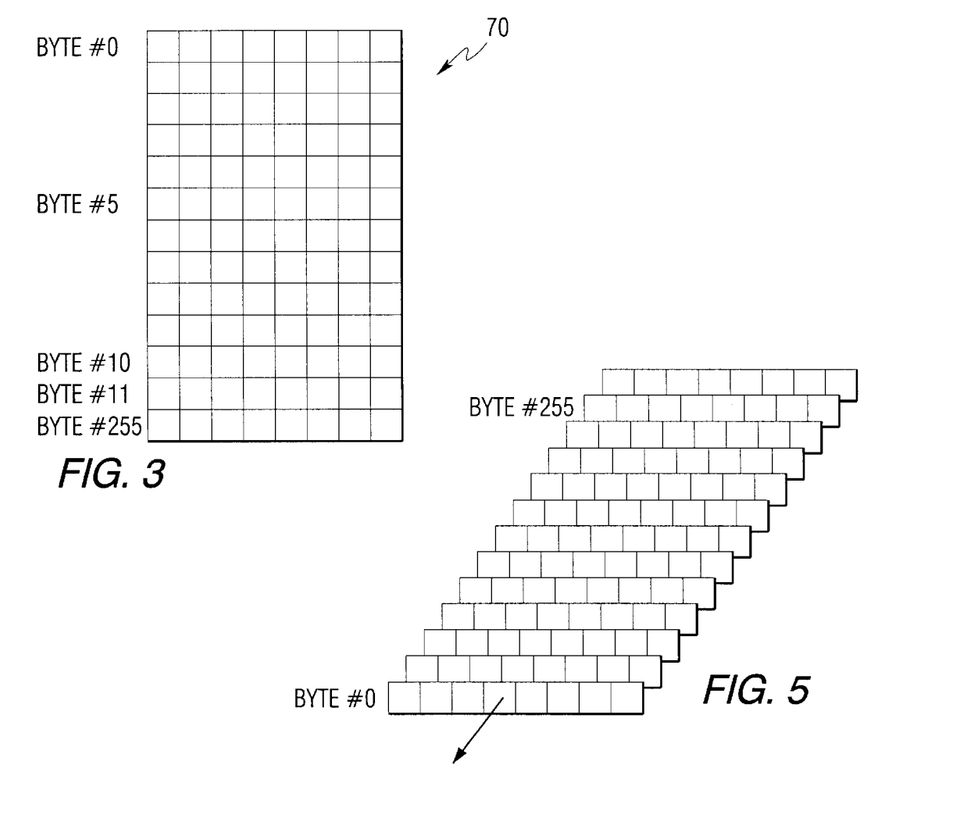
FIG. 3 illustrates the basic data packet used in conjunction with a controller area network (CAN)
FIG. 5 represents a sequence in which data is transmitted to a communication bus relating to the data packet of FIG. 3.
Figure 4:
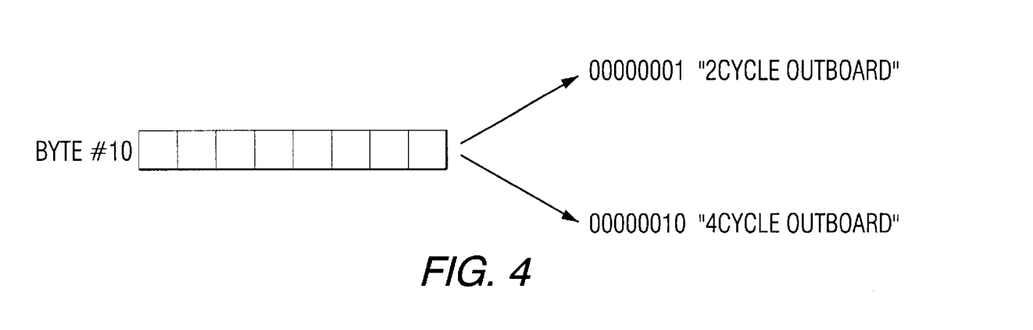
FIG. 4 illustrates how a particular byte of the data packet shown in FIG. 3 is assigned a value to represent an engine type.

FIG. 3 is a schematic representation of an exemplary data packet 70 that can be used in a controller area network (CAN) system. A total of 13 bytes, or "pages", are provided, with each page comprising 8 bit locations. As will be described in greater detail below, each page of the data packet 70 is intended to contain specific information relating to a particular parameter or operating condition for the associated marine propulsion device. The data packets are transmitted to the serial communication bus to which each of the components in FIG. 2 is connected. Each device that is connected to the communication bus is able to transmit data packets or receive data packets that are being transmitted on the bus. By the various pages of the data packet 70, information is contained which allows the various devices on the communication bus to determine the source of the data packet and whether or not the information is intended for it. Pages numbered 0 through 11 represent various items of information relating to a particular marine propulsion device. The bottom page, identified as byte number 255, represents the end page. As an example, the type of engine or marine propulsion device associated with the data packet 70 is contained in page number 10 or byte 10. FIG. 4 represents two possible binary values of byte number 10. If the least insignificant bit is set to 1 with the other bits being set to 0, this combination represents the information that the marine propulsion device is a two cycle outboard motor. If the values of the two insignificant bits of byte number 10 are reversed, this represents the information that the marine propulsion device associated with the data packet is a four cycle outboard motor.

Although it should be clearly understood that the specific bit assignments of the pages are not limiting to the present invention, a brief discussion of the exemplary assignments used in a particularly preferred embodiment will help to explain the data transfer techniques used. For example, bytes number three and four could be used, in combination, to express the oil pressure of the associated engine, measured in kPa. The combined use of bytes number five and six, for example, could be used in combination to represent the oil temperature. Although not necessary in all applications of the present invention, the combined use of two bytes allows the total of sixteen bits to be used to represent certain numeric values.

Although it should be clearly understood that all of the bit information associated with the data packet 70 is transmitted serially on the communication bus, FIG. 5 represents the order in which the pages are transmitted on the bus. Even though FIG. 5 represents the order of the bytes as they are transmitted onto the communication bus it should be clearly understood that this transmission is not parallel but, instead, is serially transmitted by the devices onto the serial communication bus. In a particular embodiment of the present invention, each page or byte requires approximately 5 milliseconds to be transmitted onto the communication bus. Since there are 13 bytes in the data packet 70, the complete data packet can be transmitted to the communication bus in approximately 65 milliseconds.

Figure 6:
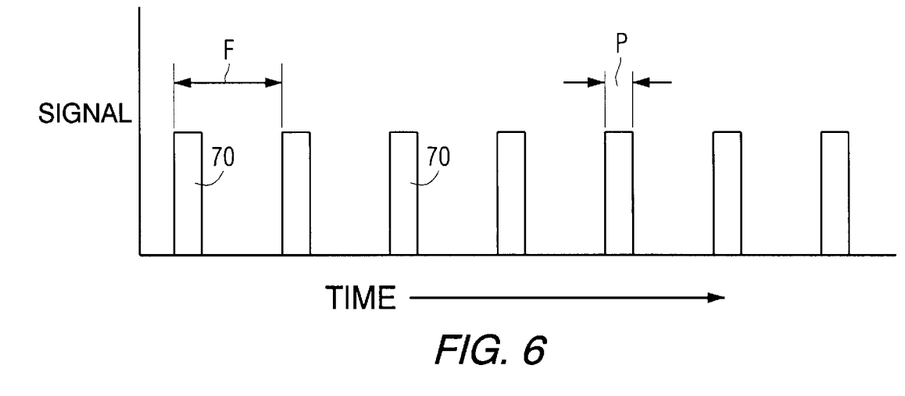
FIGS. 6 and 7 show how the number of marine propulsion devices can be detected by a microprocessor connected in signal communication with the communication bus.

Each engine control unit associated with a marine propulsion device on the system transmits its associated data packet 70 at a preselected frequency. In one particular embodiment of the present invention, this time between initiations of transmissions of its associated data packet 70 is approximately 250 milliseconds. Therefore, if one marine propulsion device is connected to the bus, a data packet would be transmitted over a period of 65 milliseconds and this transmission would be followed by a lack of data transmission for the subsequent 185 milliseconds until the data packet 70 is again transmitted by that single engine control unit. If only one data packet is transmitted within a 250 millisecond period of time, this is indicative of the fact that only one marine propulsion device is connected in signal communication with the communication bus. This relationship is illustrated in FIG. 6 where a series of data packet transmissions is represented. Each transmission lasts for a period P of 65 milliseconds and a new data packet 70 is transmitted every 250 milliseconds, as represented in arrow F in FIG. 6. The pattern shown in FIG. 6 is easily recognizable by a microprocessor connected in signal communication with the data bus. Reference numeral 70 is used in FIG. 6 to represent the transmission of the bits in the 13 bytes or pages of data contained in a data packet 70 described above and illustrated in FIG. 3.

Figure 7:
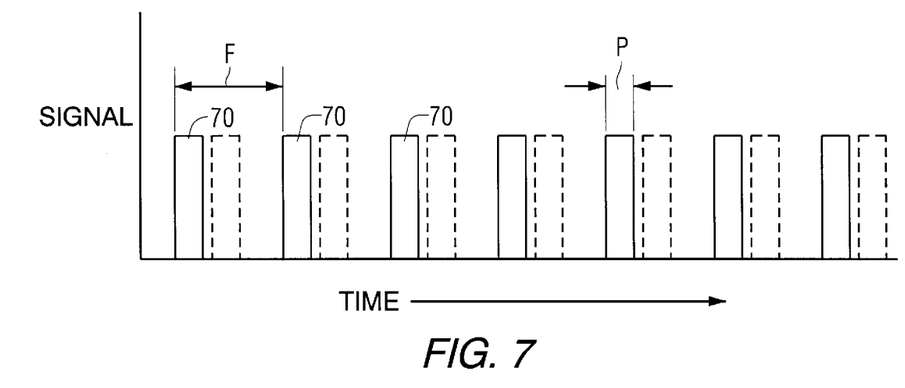

With reference to FIG. 7, it can be seen that, in addition to the transmissions of the data packet 70, additional data transmissions are evident. These are represented by the dashed line bars. This circumstance represented in FIG. 7 is caused by the connection of two marine propulsion devices to the communication bus. This is a completely normal and expected occurrence when the marine vessel 10 is being equipped with two marine propulsion devices. This can include outboard motors, two jet drives, two inboard devices, or two stern drive devices. The pattern shown in FIG. 7 is used by the present invention to ascertain the existence of a second marine propulsion device connected to the communication bus. When this occurs, it becomes necessary for the present invention to determine which marine propulsion device is on the starboard side of the marine vessel and which marine propulsion device is on the port side. In sequence, after recognizing the situation shown in FIG. 7, the present invention provides a display output to the boat builder or vessel outfitter which displays a warning combined with a statement that says "Multiple Starboard Engines". For purposes of procedural protocol, the preferred embodiment of the present invention assumes that every engine control unit transmitting to the bus is a starboard engine. If only one engine control unit is transmitting, it is referred to as a starboard engine even though it is the sole engine on the vessel. If two starboard engines are detected, the boat builder is provided with a warning that two starboard engines are evident and an instruction to identify one of the two engine control units as being associated with a port engine. This is easily done by the boat builder with the aid of a hand held programmer commonly used in association with marine vessels having engine control units or this operation of defining the location of each engine can be done by making appropriate selections on the display itself. In addition, the boat builder has the option of predefining the identity, by location, of each propulsion device as soon as it is assembled to the boat rather than waiting until prompted to do so by the present invention. When this is done, the present invention would not detect "Multiple Starboard Engines" as described above because the port and other engines would already have been properly identified. After that process is completed, one of the engine control units transmits information as a starboard engine and the other transmits information as a port engine. Naturally, if three marine propulsion devices are used, one will be identified as a center or middle unit. In this way, a microprocessor connected to the communication bus can discern the number of marine propulsion devices and, as a result of this discovery, prompt the boat builder to specifically identify by location each of the marine propulsion devices.

Figure 8:
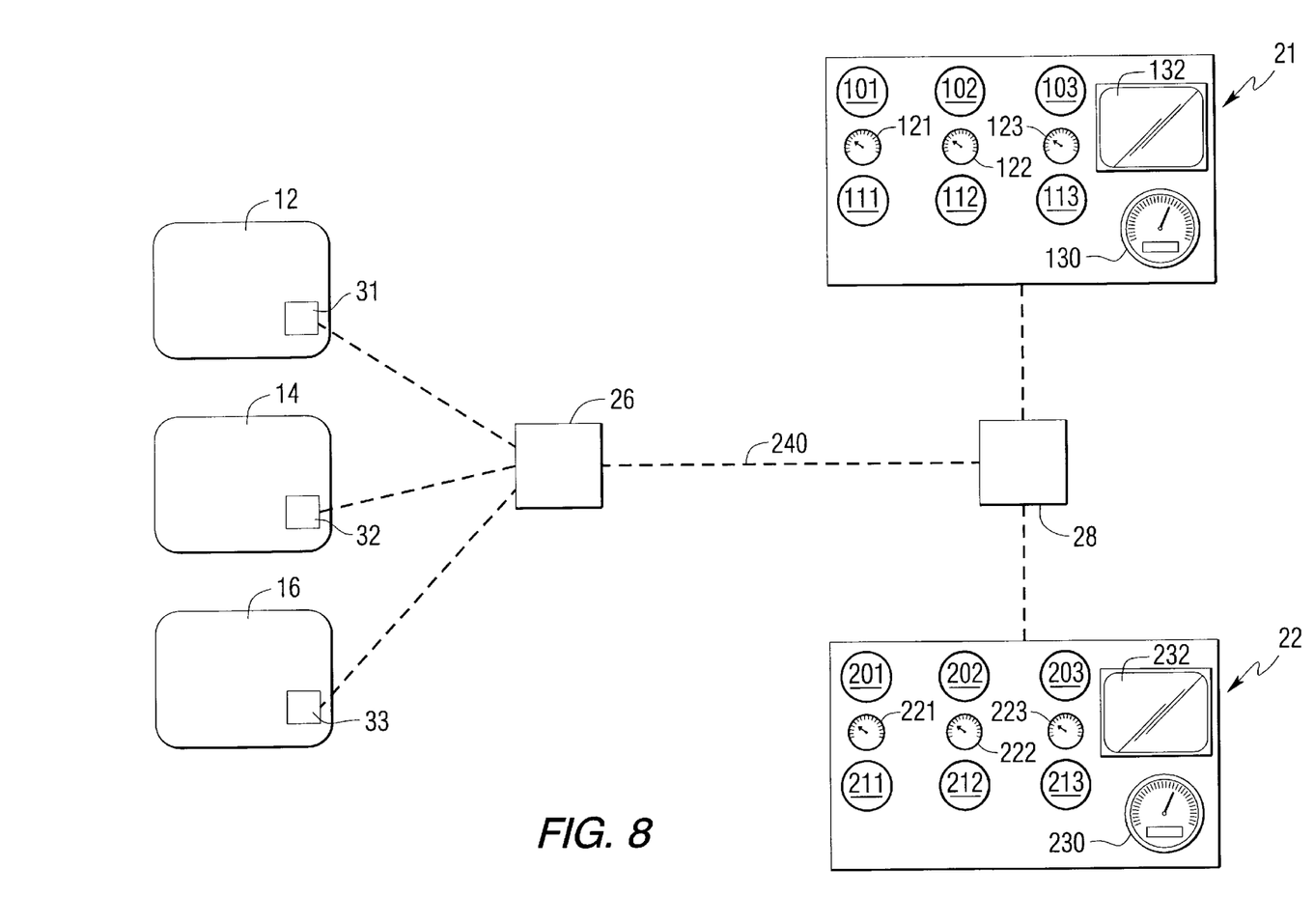
FIG. 8 shows a marine propulsion system with two helms and three marine propulsion devices, along with a plurality of gauges associated with the helm locations and the marine propulsion devices.

FIG. 8 represents a marine propulsion system with three outboard motors, 12, 14, and 16, associated with three engine control units, 31, 32, and 33, respectively. These engine control units are connected to the bus connector 26 which, in turn, is connected to bus connector 28. For purposes of simplicity, the throttle control 60 and the liquid crystal display 51 are not shown in FIG. 8. In addition, the particular gauges will be numbered differently than in the illustration of FIG. 2.

In order to show the capabilities of the present invention, each helm station, 21 and 22, will be described as having three tachometers, 101–103 and 201–203, three temperature gauges, 111–113 and 211–213, and three water pressure gauges, 121–123 and 221–223. In addition, a speedometer gauge, 130 and 230, and a liquid crystal display, 132 and 232, are represented.

With continued reference to FIG. 8, it must be understood that the information being transmitted on the serial communication bus 240 is configured in the data packet described above in conjunction with FIGS. 3 and 5. It is necessary that the temperature gauge 101 of helm station 21 convey information relating to the temperature of the cooling water flowing through the engine of the port marine propulsion device 12. Similarly, the other gauges at helm station 21 must reflect the monitored parameters for the proper marine propulsion device. It should also be understood that the various gauges and annunciators are typically purchased by the boat builder without regard to the particular location at the various helm stations at which that gauge will be assembled and installed. In other words, the boat builder does not decide that gauge 101 will represent the cooling water temperature for the port marine propulsion device 12 prior to its installation in the dash. Similarly, the boat builder does not determine that that particular gauge will be installed at one helm station 21 rather than the other helm station 22 or, for that matter, that the marine propulsion system associated with that particular marine vessel will have more than one marine propulsion device. The present invention allows each gauge to be assigned to a particular marine propulsion device and to a particular helm station by the marine vessel outfitter, or boat builder, in a simple and easily performed manner. Furthermore, the present invention provides a variety of screen displays that are automatically set to a default condition to display certain default parameters and provide the operator with certain default options based solely on the determined knowledge of the type of marine propulsion device attached to the system. In this way, irrelevant information is not displayed and the composite display screen is efficiently arranged. With reference to Table I, below, the various default conditions are illustrated. The controlling microprocessor, which is typically contained in one of the devices at the primary helm station, such as the LCD display 51 described above in conjunction with FIG. 2, contains the information shown in Table I. After the microprocessor determines the type of marine propulsion devices on the marine vessel, the default conditions are selected from the appropriate column in Table I associated with that type of marine propulsion device. For example, if it is determined that the marine propulsion device is a stern drive with troll control capability (see U.S. Pat. No. 6,109,986), the standard display on the liquid crystal display screen will show engine temperature, volts/hours, fuel flow used, engine speed in RPM, trim/water pressure, oil pressure, and cooling water pressure. It will also determine that, as a default, no remote scroll capability will be provided. The trim pop-up feature will be allowed, but the depth will not be shown. Similarly, with reference to the third column in Table I, engine temperature will be shown, but oil temperature will not. Oil pressure, trim/PS, block pressure, trim/RPM, and engine speed in RPM will be shown, but the simulator option, available on certain systems, will not be provided. It should be understood that the particular features shown in the leftmost column of Table I are not limiting to the present invention. These merely represent typical features that can be provided as a default display. It should also be understood that, even through the features are provided or not provided as a default display, an operator of the marine vessel can later select optional changes to the default display. Most of the default conditions preselected by the present invention can be altered by the operator of the marine vessel or by the boat builder when that type of alteration is acceptable and available on the particular marine vessel system.

TABLE I

|  | 4 CYCLE O.B. | 2 CYCLE O.B. | STERNDRIVE WITH TROLL | STERNDRIVE W/O TROLL | INBOARD WITH TROLL | INBOARD WITHOUT TROLL | JET DRIVE |
|---|---|---|---|---|---|---|---|
| STANDARD | Engine Temp | Engine Temp | Engine Temp | Engine Temp | Engine Temp | Engine Temp | Engine Temp |
| STANDARD | Volts/Hours | Volts/Hours | Volts/Hours | Volts/Hours | Volts/Hours | Volts/Hours | Volts/Hours |

TABLE I-continued

|  | 4 CYCLE O.B. | 2 CYCLE O.B. | STERNDRIVE WITH TROLL | STERNDRIVE W/O TROLL | INBOARD WITH TROLL | INBOARD WITHOUT TROLL | JET DRIVE |
|---|---|---|---|---|---|---|---|
| STANDARD | Fuel Flow Used | Fuel Flow Used | Fuel Flow Used | Fuel Flow Used | Fuel Flow Used | Fuel Flow Used | Fuel Flow Used |
| STANDARD | RPM | RPM | RPM | RPM | RPM | RPM | RPM |
| STANDARD |  | Trim/RPM | Trim/Water PSI | Trim/Water PSI | Oil PSI | Oil PSI | Water PSI |
| STANDARD |  | Trim/PSI | Oil PSI | Oil PSI | Water PSI | Water PSI |  |
| STANDARD |  |  | Water PSI | Water PSI |  |  |  |
| Remote Scroll | Off | Off | Off | Off | Off | Off | Off |
| Trim Popup | Off | On | On | On | Off | Off | Off |
| Depth | Off | Off | Off | Off | Off | Off | Off |
| Engine Temp | On | On | On | On | On | On | On |
| Oil Temp | Off | Off | Off | Off | Off | Off | Off |
| Oil Pressure | Off | Off | On | On | On | On | Off |
| Trim/PS | Off | On | On | On | Off | Off |  |
| Block PSI | Off | On | On | On | On | On | On |
| Trim/RPM | Off | On | On | On | Off | Off |  |
| RPM | On | On | On | On | On | On | On |
| Simulator | Yes | Yes | Yes | No | Yes | No | Yes |

The method of the present invention begins by determining the number of marine propulsion devices. This process was described in detail above in conjunction with FIGS. 6 and 7. If more than one marine propulsion device are detected and distinct identities haven't already been assigned to each engine, the boat builder is asked to assign an identity to each of the plurality of marine propulsion devices. In a preferred embodiment, this is performed by alerting the boat builder that two starboard engines have been detected and then prompting the boat builder to identify one of the two starboard engines as the port engine. By this simple entry of information, through the use of a key pad or by using the display screen prompts, the builder performs the identifying function and allows the system to proceed in the identification of the various engine types located at the various locations of the marine propulsion devices. The present invention then determines the number of helms. If more than one helm is detected, each helm is provided with an identity, such as a primary helm and a secondary helm. Each gauge is matched to a particular helm location and a particular propulsion device. In a basic embodiment of the present invention, this is performed by asking the boat builder to select from a menu in which he identifies each gauge as being associated with a particular marine propulsion device (e.g. port engine or starboard engine) and as being located at a particular helm station (e.g. primary helm or secondary helm).

In a basic embodiment of the present invention, the method performs the step of determining the number of marine propulsion devices connected to the communication bus. This is accomplished in the manner described above in conjunction with FIGS. 6 and 7. When more than one marine propulsion device is detected, an identity is assigned to each marine propulsion device, typically as a function of its location on the marine vessel. In other words, when two outboard motors are detected, the boat builder is asked to identify those two outboard motors as either the port device and the starboard device. Similarly, if a third outboard motor is detected, the boat builder is asked to identify the three outboard motors either as port, middle, and starboard. The method of the present invention then determines the number of helm stations, 21 and 22, provided on the marine vessel. Although it is common on many marine vessels to have only a single helm station, the provision of the two or more helm stations is standard on certain larger pleasure craft. Each gauge at both of the helm stations is then identified, by the boat builder, as being associated with a particular marine propulsion device and as being located at a particular helm station. Therefore, as the operator of the marine vessel switches control from one helm station to another, it is possible that certain gauges will be deactivated at the unused helm station. When the operator of the marine vessel performs this function of switching helms, the control system begins to obey commands from the input located at the selected helm while ignoring commands from the other helm.

It should be understood that the present invention can be modified significantly to accommodate different types of marine vessel configuration problems. Simply stated, the present invention allows a boat builder or marine vessel outfitter to quickly and easily connect marine propulsion devices, gauges, and sensors to a single bus system and allocate identities to the various components so that they can properly and efficiently communicate with each other. The marine propulsion devices, gauges, and other components are identified in terms of their associations with other components on the marine vessel.

Although the present invention has been described in particular detail to show several embodiments, it should be understood that alternative embodiments are also within its scope.

We claim:

1. A method for initializing a marine vessel control system, comprising the steps of:

providing a microprocessor connected in signal communication with a communication bus of said marine vessel control system;

automatically determining the number of individual marine propulsion devices connected to said communication bus associated with said marine vessel; and identifying each of said individual marine propulsion devices when it is determined that more than one of said individual marine propulsion devices are associated with said marine vessel.

2. The method of claim 1, further comprising:

determining the number of control stations associated with said marine vessel; and identifying each of said control stations when it is determined that more than one of said control stations are associated with said marine vessel.

3. The method of claim 1, wherein:

said number of individual marine propulsion devices determining step comprises the step of interrogating a signal on said communication bus to determine if more than one of said individual marine propulsion devices is transmitting a signal on said communication bus.

4. The method of claim 1, further comprising:

prompting an operator to identify the physical location of each of said individual marine propulsion devices on said marine vessel when it is determined that more than one of said individual marine propulsion devices are associated with said marine vessel; and identifying each of said individual marine propulsion devices in terms of said physical location of each of said individual marine propulsion devices on said marine vessel.

5. The method of claim 1, further comprising:

determining the number of individual gauges associated with said marine vessel; and identifying each of said individual gauges in terms of its relationship with an associated one of said individual marine propulsion devices on said marine vessel when more than one of said individual gauges are associated with said marine vessel.

6. The method of claim 5, further comprising:

prompting an operator to identify each of said individual gauges in terms of its association with an associated one of said individual marine propulsion devices on said marine vessel and in terms of its association with one of said control stations.

7. The method of claim 1, wherein:

said marine vessel control comprises a controller area network system.

8. The method of claim 1, further comprising:

determining the operational type of each of said individual marine propulsion devices associated with said marine vessel.

9. The method of claim 8, wherein:

said operational type of each of said individual marine propulsion devices associated with said marine vessel is obtained from a data packet comprising a plurality of bytes of information.

10. The method of claim 9, wherein:

said data packet is transmitted on a controller area network communication bus by each of said individual marine propulsion devices associated with said marine vessel.

11. The method of claim 1, further comprising:

selecting a default screen display for each of said control stations as a function of the operational type of each of said individual marine propulsion devices.

12. A method for initializing a marine vessel control system, comprising the steps of:

determining the number of individual marine propulsion devices associated with said marine vessel by interrogating a signal on a communication bus to determine if more than one of said individual marine propulsion devices is transmitting a signal on said communication bus;

identifying each of said individual marine propulsion devices when it is determined that more than one of said individual marine propulsion devices are associated with said marine vessel;

prompting an operator to identify the physical location of each of said individual marine propulsion devices on said marine vessel when it is determined that more than one of said individual marine propulsion devices are associated with said marine vessel; and identifying each of said individual marine propulsion devices in terms of said physical location of each of said individual marine propulsion devices on said marine vessel.

13. The method of claim 12, further comprising:

determining the number of control stations associated with said marine vessel;

identifying each of said control stations when it is determined that more than one of said control stations are associated with said marine vessel;

determining the number of individual gauges associated with said marine vessel; and identifying each of said individual gauges in terms of its relationship with an associated one of said individual marine propulsion devices on said marine vessel when more than one of said individual gauges are associated- with said marine vessel.

14. The method of claim 13, further comprising:

prompting an operator to identify each of said individual gauges in terms of its association with an associated one of said individual marine propulsion devices on said marine vessel and in terms of its association with one of said control stations.

15. The method of claim 14, further comprising:

determining the operational type of each of said individual marine propulsion devices associated with said marine vessel, said operational type of each of said individual marine propulsion devices associated with said marine vessel being obtained from a data packet comprising a plurality of bytes of information.

16. The method of claim 15, wherein:

said data packet is transmitted on a controller area network communication bus by each of said individual marine propulsion devices associated with said marine vessel.

17. The method of claim 16, further comprising:

selecting a default screen display for each of said control stations as a function of the operational type of each of said individual marine propulsion devices.

18. A method for initializing a marine vessel control system, comprising the steps of:

determining the number of individual marine propulsion devices associated with said marine vessel by interrogating a signal on a communication bus to determine if more than one of said individual marine propulsion devices is transmitting a signal on said communication bus;

identifying each of said individual marine propulsion devices when it is determined that more than one of said individual marine propulsion devices are associated with said marine vessel;

determining the number of control stations associated with said marine vessel;

identifying each of said control stations when it is determined that more than one of said control stations are associated with said marine vessel;

prompting an operator to identify the physical location of each of said individual marine propulsion devices on said marine vessel when it is determined that more than one of said individual marine propulsion devices are associated with said marine vessel;

identifying each of said individual marine propulsion devices in terms of said physical location of each of said individual marine propulsion devices on said marine vessel;

determining the number of individual associated with said marine vessel; and identifying each of said individual in terms of its relationship with an associated one of said individual marine propulsion devices on said marine vessel when more than one of said individual are associated with said marine vessel.

19. The method of claim 18, further comprising:

prompting an operator to identify each of said individual in terms of its association with an associated one of said individual marine propulsion devices on said marine vessel and in terms of its association with one of said control stations; and determining the operational type of each of said individual marine propulsion devices associated with said marine vessel, said operational type of each of said individual marine propulsion devices associated with said marine vessel being obtained from a data packet comprising a plurality of bytes of information, said data packet being transmitted on a controller area network communication bus by each of said individual marine propulsion devices associated with said marine vessel.

20. The method of claim 19, further comprising:

selecting a default screen display for each of said control stations as a function of the operational type of each of said individual marine propulsion devices.

* * * * *